United States Patent [19]

Biddle et al.

[11] 4,013,479
[45] Mar. 22, 1977

[54] AQUEOUS NATURAL RESINOID COMPOSITIONS

[76] Inventors: Arthur Biddle, 3405 Floyd Ave., Richmond, Va. 23221; Alpheus Eugene Clonts, 325 N. Laburnum Ave., Richmond, Va. 23223

[22] Filed: May 23, 1975

[21] Appl. No.: 580,337

[52] U.S. Cl. .............................. 106/133; 106/144; 106/236
[51] Int. Cl.² .................. C08L 89/00; C08L 93/02
[58] Field of Search .......... 106/144, 236, 238, 218, 106/16, 133; 426/4, 651; 260/97.5, 102

[56] References Cited
UNITED STATES PATENTS

| | | | |
|---|---|---|---|
| 2,686,732 | 8/1954 | Montgomery | 106/238 |
| 2,857,361 | 10/1958 | Fitz Gerald | 260/45.95 G |
| 2,886,445 | 5/1959 | Rosenthal | 426/651 |
| 3,261,705 | 7/1966 | Gallagher | 106/238 |

OTHER PUBLICATIONS

Chem. Abstract 54:17,756a.

*Primary Examiner*—Theodore Morris

[57] ABSTRACT

An aqueous coating and/or sizing composition base comprising, a natural resin made water soluble, emulsified, or water dispersed with the aid of an alkaline agent with or without the addition of mono, di, tri, or other related ethanolamine. Said aqueous natural resinoid base so made is then treated with an aldehyde belonging to the generic family known as "Vanillin." The vanillin serving in a dual role as a cross-linking agent and as a reactant chemical to neutralize or eliminate obnoxious ammonical fumes when the aforesaid alkaline agent is or contains ammonia. Aqueous supporting colloids, pigments, etc. may be mixed therewith according to specific end uses. The use of organic solvents is sometimes necessary to bring about the aqueous nature of the composition.

11 Claims, No Drawings

AQUEOUS NATURAL RESINOID COMPOSITIONS

This invention relates to an aqueous coating composition base and method for producing the same, said coating composition base comprising a natural hydrophobic resin, made hydrophilic with the use of an alkaline agent in the presence of water. When said alkaline vanillin is ammoniacal the aldehyde vanillan is added to eliminate obnoxious and/or toxic ammonia fumes as well as to crosslink with ammonia and form a new agent to react with the natural resin.

The present invention is related to a composition of an aqueous form of a natural resin with the admixture thereto of ammonia and an ethanolamine reacted together under pressure and elevated temperature.

This invention also relates to a method of aqueously solubilizing a natural resin and the addition thereto of a new form of amine formed by the reaction of ammonia and an ethanolamine such as diethanolamine, with or without the further addition of an aldehyde such as vanillic aldehyde to eliminate, neutralize or make non-apparent noxious ammonical fumes.

A further intent of my invention is to make a sizing to be applied to metallic sheets or metallic foils. Said sizing to be of minimal quantity and to act as very thin substrate for the better adherence of subsequent coatings or printing matter.

Another form of our new composition is the addition of an aqueous colloid to support and or add new characteristic to the aforementioned aqueous form of natural resin. Other phases of our new invention will become obvious in the specification.

In recent years coatings made of the newer and complicated synthetic resins have largely supplanted the older and versatile natural resins. Yet the natural resins possess properties and characteristics for certain purposes that are not inherent to the synthetics.

Before proceeding further it is necessary to clarify the nomenclature relative to resins and more particularly the natural resins as differentiated from synthetic resins.

While there are a few grey areas in classifying natural resins, the great majority of knowledgeable people in the field agree on the following classification taken from Natural Resins Handbook by "American Gum Importers Association."

The resins in this classification are the water insoluble type and are exudations of various types of plants.

Batavia and Singapore, representing the Damars; Batu, Black, Singapore and Macassar pale East Indias. For Copals there are Boea, Pontianak, Philippine Manilas, Lobas and Melengkets. In this class is also included the Kauris and Congos. Of the miscellaneous resins maybe mentioned; Accroides, Elemi, Mastic and Sandarac.

The Natural Resin trade usually refers to natural resins as "gums." In strict terminology however the "gums" are related to sugars and carbohydrates. The gums are generally soluble in water while the natural resins are generally insoluble in water and soluble in various organic solvents. Broadly speaking, the gums may be classified as hydrophyllic whereas the resins, pitches and tars are more properly listed as hydrophobics.

There are several natural resins not mentioned in the above.

As examples of Plant Resins there are, Colophony resin (Plain rosin from gum thus as well as the Chinese and Japanese counterparts Rhus vernicifera.) Our invention includes in its scope the use of rosin treated with lime (calcium hydroxide) zinc oxide or other metallic chemicals to make the rosin possess superior qualities. Rosin and its multitude of by products are definitely not synthetic resins but are alterations of the basic gum thus.

While there are several natural animal resins, namely shellac and silk our primary interest in this class with the animal resin commonly identified as shellac.

This resin was thought to be the exudation of various bushes or trees but it was determined to be the exudation of the lac insect. This insect lived on the plant juice and converted the plant juice to a resinous exudation in which it became incrusted.

The shellac resin is in many shades of amber, wax contents and degrees of bleaching. The scope of our invention includes all of the various types, shapes and forms of the lac resin. In our disclosure the word shellac is intended to be all inclusive.

Of the mineral resins there may be mentioned; Sodium and/or Potassium Silicate, Coal tars and Pitches (aliphatics), Gilsonite (earthbitumen), Asphalt (such as Trinadad).

Mineral resins may be made dispersible but not water soluble like a resin or shellac among others. The various methods of doing this will be discussed later.

In the pursuit of some phases of our new and improved coatings and sizings we use hydrophyllic colloids or water soluble supporting materials. Among these may be mentioned, casein, egg and blood, albumin water, soluble gums such as Arabic Tagacanth and Karaya.

Casein is classed as glue and by some as a protein albummoid. Coming from milk it really is an animal hydrophyllic colloid. Bone and hyde glue (or gelatin) are good supporting colloida hydrophis. Fish glue is another satisfactory aqueous colloid suitable for our purpose.

When a comparatively weak aqueous colloid may be satisfactory we use aqueous colloids from the carbohydrate family such as the starches, (potatoe) corn, wheat, chasava, saponin, etc.). Gluten is for certain purpose a good supporting colloid but often requires dispersing first. Various chemical, emzyme or terifacted starches like dextrine may also be used.

For some supporting purposes we may use a mineral hydrophyl such as a soluble sodium or potassium silicate. Another supporting non toxic colloid suitable for the compositions as herein disclosed is Zein, an alcoholic extraction of ground corn. Due to its solubility in water and alcohol it has viable admixture attributes. When a hydrophil that is resistant to mold or bacteria is desired the use of carboxy methyl cellulose (CMC) is advantageous as it is substantially non reactive with many other ingredients of the natural resin compositions as described herein.

Soya protein may be used in some instances as an alternative for casein. However soya protein tends to foam and may require an anti-foaming agent such as cream (from milk) or pine oil or butyl alcohol when the butyl odor is not objectionable.

The essential ingredient of this invention is the use of vanillin of the formula $(C_8H_8O_3)$. It has not been unusual to use formaldehyde with ammonium hydroxide to insolubilize casein. Formaldehyde is toxic in large amounts especially when not liberated or crosslinked in the end products. There is also the problem of excess odoriferous ammonia gas ($NH_3$) or excess formaldehyde fumes, both of which are hazardous and contrary to ecological standard.

From current literature 3,4-dehydroxybenzaldehyde is another manner of stating protocatedin aldehyde. Whatever the nomenclature or mode of expressing the terms, they all spell out vanillin ($C_8H_8O_3$) which is soluble in water, glycerides and alcohol, ether and chloroform. The technical derivation for vanillin is vanillin aldehyde. The melting point is 82° C which makes it fluid in composition at somewhat elevated temperatures, especially when our coating compositions are dried with heat.

As stated previously, the exact chemical reaction involved in the reaction of vanillin with ammonia to render the $NH_3$ impervious to escaping in the atmosphere is uncertain.

The use of plasticizers is optional depending on the elasticity needed and the amount of adherence to the substrate is required. As examples maybe mentioned the plant oil plasticizers such as Cotton, Rapeseed, Linseed or Resin oil. The Phythlates, Sebacates, Phosphates. Many rosin derivatives such as Rosin esters, Avalyn, Pentalyn, Hercolyn, Stabilites, Polypale esters made by Hercules Chemical Company of Wilmington, Delaware are of considerable value for certain end uses. Where water resistance of the natural resin composition as herein described is not a requirement, glycerine, sorbital or soaps may act as plasticizers. It is understood that the plasticizers as suggested not only plasticize the aqueous natural resins but the supporting colloids as well.

Dye and or pigment colors are too well known to be given in detail. However care should be taken to make sure the dye or color chosen is compatible with any or all of the other components of the composition. Especially should they be resistant to alkali when the alkali content exceeds, say a pH of 8. Such pigments as zinc oxide, titanium oxide, earthy colors or synthetic oxides, ultramarines, phthalocyanines, chromium oxide and most all blacks, are adaptable to our composition.

When fluorscent colors are to be used care should be taken to have a minimum of fillers in order not to hide the fluorscent effect. This also applies to aluminum or bronzing flakes or particles. The use of dyes or flushed transparent colors such as the phthalocyanine is viable with other ingredients in the composition.

In the performance of our invention the first and essential step is to put the natural resin in aqueous phase. While a plain loose lidded container will do it is better if a refluxed container is used. This type requires less solvent when solvents are used and prevents liberation of noxious fumes. Quicker solvation and water solution is reached if the resin is somewhat crushed.

The subjection of the resin to the presence of plain tap water with from 7 to 15 percent of alkali with or without the addition of an ethanolamine such as, for example, diethanolamine, with the application of heat, causes many natural resins to go into the aqueous phase. The temperature may be from room temperature to 300 fahrenheit or even greater according to the pressure the cooking container will safely stand. The cooking time element may vary from one half hour to ten or twenty hours depending on the fineness of the resin, the strength of the alkali, the temperature and pressure.

When solvents are used possibly because the resin is difficult to convert into the aqueous phase directly with ammonia and/or other alkalies, various solvents may be used. The organic solvents necessary for different natural resins are well known and merely require end use choice. As an example if sandarac is to be used as a component resin some form of alcohol or cellosolve solvent would be used to cause solution. Kauri would be boiled in linseed oil. In the case of oil solutions, the oil becomes an integral part of the composition, whereas volatile solvents like ethyl, methyl or butyl alcohol may or may not remain in solution. In case of oil solutions, when the oil dissolved resin is put in the aqueous phase, an emulsion or dispersion results. Further, with aqueous dispersions or emulsions are made, it is generally necessary to use one of the ethanolamines such as morpholine or diethanolamine with an alkali such as ammonia to stabilize the dispersion or emulsion. As a rule the ammonia, when it is used is in equal proportions to the ethanolamine. There are however resins that require a preponderance of either to bring about a staple aqueous phase.

After the aqueous phase has been achieved by rapid stirring homogenization or high frequency agitation or other means well known in the art, an aldehyde or aldehydes are added to the heated resin in aqueous phase. Vanillin ($C_8H_8O_3$) may be dissolved in an alcohol or cellosolve solvent and then added to the aqueous resin component in sufficient amount to neutralize or react with the ammonia. When the vanillin is to also act as a crosslinking agent care must be exercised to add the vanillin very slowly with rapid agitation of the heated resin solution or emulsion to prevent undue thixotrophy or coagulation. Some times a few percent of aqua ammonia added to the vanillin solution prevents coagulation.

Certain end uses of the composition comprising a resin in aqueous phase treated with vanillin require flexibility, toughness or other properties when metals, leather, paper, cloth, etc. are coated or treated. The addition of five to twenty percent solution of a water solution of a hydrophillic colloid tends to not only supply the deficient qualities but acts as a supporting medium to increase working and shelf stability. Colloids like casein can be used in rather heavy concentrations, while aqueous or hydrophillic colloids like starch, gum karaya are used in low concentrations due to their high viscosities.

Besides the addition of vanillin which acts as a dual role agent to react or neutralize the ammonia in either the resinoid solution or the hydropile, other aldehydes in small amounts such as formaldehyde may be added to preserve or crosslink with the other components and form tougher, more water resistant end materials.

A third phase of our invention is the addition of a new amine other than the ethanolamines but which belongs to the same generic family. This new amine gives our resinoid compositions with or without addition thereto of supporting hydrophitic colloids, many unusual characteristics. Among which maybe mentioned great toughness, flexibility and substrate adhesion.

One method of making this new amine is to incorporate ammonia ($NH_3$ or $NH_4OH$) and one or more amines such as mono, di, or tri or dimethyl, ethanolamines into a pressure container and subject the mixture to approximately 40 pounds pressure for a period of from ten minutes with the aid of suitable heat.

If the resultant new amine is to be alkaline, more ammonia than ethanolamine maybe used, otherwise use more ethanolamine than ammonia. The new amine so formed is then added to the resinoid solution, or to the resinoid solution admixed with the proper supporting aqueous colloid.

The third phase of the invention is to add sufficient vanillin to the above compositions to neutralize or react with excess ammonia.

In this invention it is understood that the aqueous nature of the different phases of the resinoid compositions hold true regardless of the percent of water component, as long as there is water present. This means that the resinoid solutions may be in complete organic solution without water what ever. The aqueous derivation being achieved from the water in the aqueous ammonia such as the addition to any of the resinoid components of aqueous ammonia of say 26° Beaume or approximate thereto. Several examples of the invention are given herewith:

EXAMPLE 1

Film sizing on aluminum or other metallic sheets or foils, webs or structures: To 2 gallons of denatured or isopropal alcohol add 1 half-gallon to one gallon of 5 pound cut shellac in alcohol. To this is added one half-gallon of aqueous alcohol and 50 gallons of water. The ammonia maybe increased if the metallic surfaces are oily to get better adhesion of subsequent coatings.

In the above formula the 50 gallons of denatured alcohol or isopropal alcohol maybe substituted for the water. The necessary addition of the aqueous ammonia makes the composition an aqueous or hydrophilic medium.

To this shellac composition however made, is added vanillin in either water or alcoholic solution in sufficient quantity to neutralize the excess ammonia present. From one quarter pound to 4 pounds of vanillin may be required.

If the shellac compositions are to be used to coat or treat leather, paper, wood or textiles, the concentration of shellac maybe increased and a solution of a hydrophilic colloid such as casein, zein or soya protein maybe added to the shellac component.

EXAMPLE 2.

To forty pounds of manilla resin is added 20 pounds cellosolve solvent, 40 pounds water, one pound aqua ammonia of 26° Beaume. Heat and agitation is applied until solution takes place. If there is difficulty in solvation, increase the ammonia, cellosolve solvent. If too viscous, increase the water. A reflux condenser on the cooking container will prevent loss of ammonia and solvent.

Another phase of the aqueous manilla resin composition is the addition of a hydrophilic colloid solution such as: To 10 pounds of dry casein add 60 pounds of water and 1.7 pounds of ammonium hydroxide. Heat to about 75° C until dissolved.

To the resinoid solution add dissolved vanillin or sufficient to neutralize the ammonia. If casein is present add the aldehyde in a weak water solution very slowly to avoid coagulation of the casein. When adding the vanillin to a plain resin solution, it maybe dissolved in alcohol or cellosolve solvent. A trace of ammonia to the vanillic aldehyde solution appears to keep it in solution.

Zein or soya protein may be substituted for casein. Zein or gums such as Arabic or Tragacanth are sometimes favored because of alcohol compatability.

In the third phase of our invention, as stated before, is the addition of the new amine to aqueous resinoid component alone or with a supporting hydrophilic colloid. The proportion of the new amine may be from 1 to 50 percent of the resinoid component with or without supporting colloids and/or colors, fillers etc. The amount of new amine additive may depend on its thickening or coagulative effect. Considerable greater amounts may be added to resinoid mixtures when no hydrophils such as casein are present.

The use of alkalies such as borax, sodium carbonate, sodium bicarbonate, sodium or potassium hydroxide, or the various alkaline phosphates may be used to assist aqueous solubility of the resins and the hydrophilic colloids. It generally takes from 5 to 16 percent of the alkali to 100 parts of the resin or hydrophilic colloids. However when such solvating agents are used they remain in the mixture and decrease water resistance and create alkalinity problems. Retentive alkaline agents also affect the clarity of film-forming natural resinoid compositions.

What is claimed is:

1. A natural resin coating composition base comprising a liquid carrier base for said resin, a solubilizing agent for said resin, and vanillin in the presence of ammonia. The natural resin being a member of the plant, animal or mineral resinoid substances. Said vanillin being present in amounts to sufficiently eliminate obnoxious odors and poisonous effects of the fumes emitted by excess ammonia after the crosslinking action has taken place.

2. The coating composition of claim 1 wherein said resin is the animal resin shellac.

3. The coating composition of claim 1 wherein said liquid carrier agent is essentially an organic solvent.

4. The coating composition of claim 1 wherein said liquid carrier agent is composed of an organic solvent and water.

5. The coating composition of claim 1 wherein the solubilizing agent for said resin is ammonium hydroxide.

6. The coating composition of claim 1 wherein vanillin is present is amounts of approximately 0.1 to 6 percent by weight of said composition.

7. A natural resin coating composition consisting essentially of a base comprising a liquid carrier medium for said natural resin, a solubilizing agent for said natural resin, an amine formed by the reaction of ammonia and a member of the ethanolamine family under pressure, temperature from 50 to 150° C, and vanillin.

8. The coating composition of claim 7 which also includes an hydrophilic colloid.

9. The coating composition of claim 7 which also includes a coloring agent of approximately 0.1 to 100 percent of said composition.

10. The coating composition of claim 8 in which the hydrophilic colloid is casein.

11. A process for producing a resinoid coating composition base which comprises the admixture of said resinoid in a liquid carrier medium in the presence of a solubilizing agent, subjecting said mixture to agitation and heat and then admixing therewith vanillin in the presence of ammonia.

* * * * *